United States Patent
Gallagher et al.

(10) Patent No.: US 6,295,816 B1
(45) Date of Patent: Oct. 2, 2001

(54) TURBO-CHARGED ENGINE COMBUSTION CHAMBER PRESSURE PROTECTION APPARATUS AND METHOD

(75) Inventors: Shawn Michael Gallagher; Ihab Khalil; Doug Glenn, all of Erie, PA (US); Juan Carlos Alvarez, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/577,768

(22) Filed: May 24, 2000

(51) Int. Cl.$^7$ ...................................... F02B 33/44
(52) U.S. Cl. ................. 60/611; 60/600; 60/601; 123/564
(58) Field of Search .............. 60/611, 600, 601; 123/564

(56) References Cited

U.S. PATENT DOCUMENTS

| | | | |
|---|---|---|---|
| 4,122,679 | * 10/1978 | Charron | 60/611 |
| 4,169,355 | 10/1979 | Walsham et al. . | |
| 4,183,216 | * 1/1980 | Tanaka et al. | 60/611 |
| 4,372,119 | * 2/1983 | Gillbrand et al. | 60/600 |
| 4,424,675 | 1/1984 | Ojima . | |
| 4,428,199 | 1/1984 | Moore et al. . | |
| 4,434,761 | 3/1984 | Ludwig . | |
| 4,557,111 | 12/1985 | Haussmann et al. . | |
| 4,630,445 | 12/1986 | Parker . | |
| 4,655,040 | 4/1987 | Parker . | |
| 4,763,474 | 8/1988 | Franklin . | |
| 4,779,423 | 10/1988 | Szczupak . | |
| 5,261,236 | * 11/1993 | Ironside et al. | 60/600 |
| 5,477,840 | 12/1995 | Neumann . | |
| 5,526,645 | * 6/1996 | Kaiser | 60/611 |
| 5,579,643 | 12/1996 | McEwen et al. . | |
| 5,724,813 | 3/1998 | Fenelon et al. . | |
| 5,755,101 | 5/1998 | Free et al. . | |
| 5,778,674 | * 7/1998 | Kimura | 60/600 |
| 5,782,092 | 7/1998 | Schultalbers et al. . | |
| 5,819,538 | * 10/1998 | Lawson, Jr. | 60/611 |
| 5,850,737 | 12/1998 | Aschner et al. . | |
| 5,850,738 | 12/1998 | Hayashi . | |
| 6,000,222 | 12/1999 | Regnier . | |

* cited by examiner

Primary Examiner—Thomas Denion
Assistant Examiner—Thai-Ba Trieu
(74) Attorney, Agent, or Firm—Carl A. Rowold, Esq.; David G. Maire, Esq.; Beusse, Brownlee, Bowdoin & Wolter PA

(57) ABSTRACT

An apparatus (11) for controlling the peak pressure in the combustion chamber (46) of a turbo-charged diesel locomotive engine (12). A pressure relief valve (56) is disposed in the compressor discharge downstream of the turbocharger (18). The relief valve (56) is operable to release a selected amount (58) of the compressed air (24) produced by the compressor section (20) of turbo-charger (18). The actuation of valve (56) may be a function of the pressure of the compressed air (24), and/or a manifold air temperature signal (52) and a fuel injection timing signal (40). An actuator (60) attached to valve (56) is responsive to a valve position signal (62) generated by a controller (38) having the appropriate inputs and programmed logic capability.

10 Claims, 3 Drawing Sheets

TURBO-CHARGED ENGINE COMBUSTION CHAMBER PRESSURE PROTECTION APPARATUS AND METHOD

BACKGROUND OF THE INVENTION

The present invention relates generally to the field of rail locomotives and more particularly to a method and apparatus for protecting a turbo-charged diesel locomotive engine from excessively high pressure in the combustion chamber.

It is known that excessively high pressure in the combustion chamber of an internal combustion engine can cause damage to the engine pistons, cylinder heads, and other components. The peak combustion chamber pressure is a function of the combustion process and the conditions of the incoming combustion air. The operation of a turbo-charger increases the peak combustion chamber pressure by increasing the temperature and pressure of the incoming air.

There are many known prior art arrangements for limiting the combustion chamber pressure. U.S. Pat. No. 4,655,040 issued on Apr. 7, 1987, to Parker discloses a relief valve (waste-gate valve) to bypass a portion of the engine exhaust gases around the turbine portion of a turbo-charger in order to limit the amount of pressure boost provided by the compressor portion of the turbo-charger. Waste gate valves are particularly expensive because they must be designed to operate in the harsh environment of the exhaust system.

U.S. Pat. No. 4,557,111 issued on Dec. 10, 1985, to Haussmann et al. discloses a control system for engaging and disengaging the operation of a turbo-charger. The apparatus of Haussmann is particularly useful for applications where the throttle setting of the engine is varied often. It is undesirable to utilize any system which cycles the turbo-charger on and off for applications where the engine operates for extended periods at a steady speed, such as in locomotive applications.

U.S. Pat. No. 4,434,761 issued on Mar. 6, 1984, to Ludwig teaches a fuel flow regulator which reduces the rate of flow of fuel to a diesel engine when the manifold intake air pressure is greater than a pre-determined value in order to protect the engine from an over-boost condition. It is undesirable to utilized a control system that decreases the fuel flow to a locomotive engine since the overall power production of the engine is a prime operating consideration.

U.S. Pat. No. 5,782,092 issued on Jul. 21, 1998, to Schultalbers et al. describes a control arrangement for a turbo-charger having a variable turbine geometry for controlling the output pressure of the compressor section of the turbo-charger. Variable turbine geometry turbo-chargers are expensive and are primarily beneficial in applications where the engine speed must be varied often, and where acceleration of the vehicle is a primary consideration. As such, the apparatus of Schultalbers is not particularly well suited for application to a turbo-charged diesel locomotive engine.

BRIEF SUMMARY OF THE INVENTION

Thus there is a particular need for a method and apparatus for protecting a turbo-charged diesel locomotive engine from excessively high combustion chamber pressure. Such a system should preferably be simple and inexpensive, and should not reduce the power output of the engine.

Accordingly, a power unit for a locomotive is described herein as including: a diesel engine having an intake manifold for receiving compressed air and an exhaust manifold; a turbo-charger having a turbine portion connected to the exhaust manifold and a compressor section having an outlet connected to the intake manifold, the turbo-charger operable to provide compressed air to the intake manifold at an intake manifold air pressure; and a relief valve in fluid communication between the turbo-charger outlet and the intake manifold and operable to release a selected amount of the compressed air to atmosphere in response to the intake manifold air pressure.

A method of protecting a turbo-charged diesel locomotive engine from excessively high combustion chamber pressure is also described herein, the method comprising the steps of: determining an allowable combustion chamber pressure for the turbo-charged diesel engine; determining a first pressure rise in the combustion chamber over the first pressure rise as a function of the manifold air temperature; determining a second pressure rise in the combustion chamber over intake manifold air pressure as a function of a timing of fuel injection into the combustion chamber; determining a program intake manifold air pressure as a function of the allowable combustion chamber pressure, the first pressure rise, and the second pressure rise; comparing the program intake manifold air pressure to actual intake manifold air pressure to determine a control pressure differential; and controlling the intake manifold air pressure as a function of the control pressure differential.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
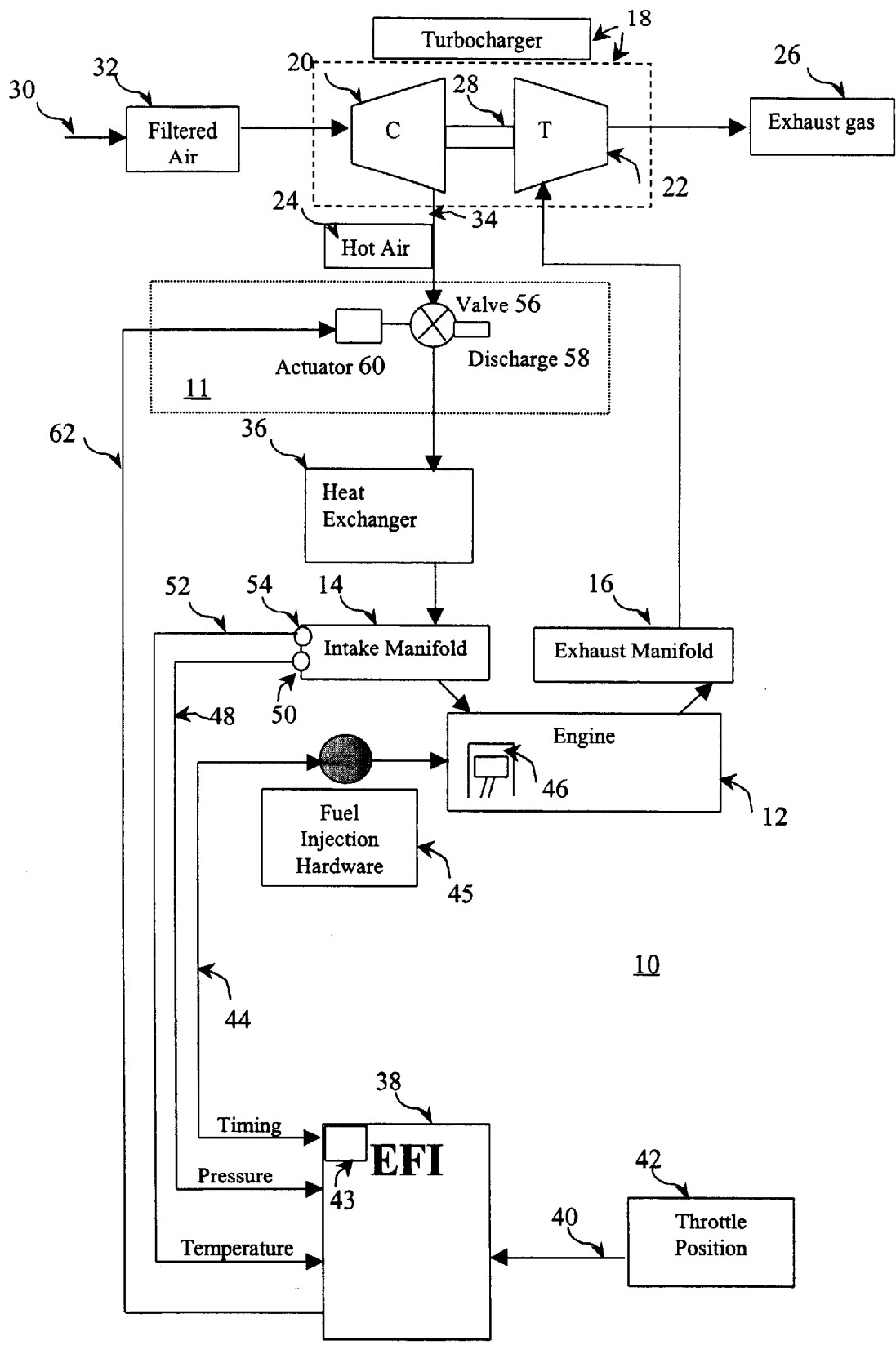
FIG. 1 is a schematic illustration of a power unit for a locomotive including a turbo-charged diesel engine having a relief valve operable to discharge a portion of the compressed air produced by the turbo-charger.

FIG. 1 is a schematic illustration of a locomotive power unit 10. The power unit 10 includes a diesel engine 12 having an intake manifold 14 and an exhaust manifold 16. A turbo-charger 18 having a compressor section 20 and a turbine section 22 is operable to provide compressed air 24 to the intake manifold 14 for combustion within engine 12. The turbine portion 22 of the turbo-charger 18 is connected to the exhaust manifold 16 for extracting energy from the exhaust gases 26 for rotating shaft 28 connected to compressor portion 20. Compressor section 20 draws ambient air 30 through filter 32 and provides compressed air 24 through an outlet 34 connected to the heat exchanger 36, then the intake manifold 14. The compressed air 24 will be heated to an elevated temperature by the process of compression, and therefore it is passed through a heat exchanger 36 to lower its temperature prior to delivery into the engine 12. Heat exchanger 36 may be any form of intercooler or aftercooler as known in the art, and is typically an air-to-water heat exchanger utilizing the engine coolant to remove heat from the compressed air 24.

The apparatus of FIG. 1 also includes a controller 38, which may advantageously be the electronic fuel injection controller for the engine 12. Controller 38 receives a throttle setting signal 40 from an operator controlled throttle 42, and contains circuitry 43 operable to produce timing signal 44 for controlling the operation of fuel injector 45 for injecting fuel into the combustion chambers 46 of engine 12. The controller 38 also receives as inputs an intake manifold air pressure signal 48 generated by pressure transducer 50 and intake manifold air temperature signal 52 generated by temperature sensor 54.

Power unit 10 also includes an apparatus 11 for controlling the peak pressure in the combustion chamber 46 of the engine 12, as will be described more fully below. A valve 56 is connected in fluid communication between the turbocharger outlet 34 and the heat exchanger 36 and is operable, when open, to release a selected portion 58 of the compressed air 24 to the ambient atmosphere. By reducing the amount of compressed air 24 being provided to engine 12, relief valve 56 functions to reduce the intake manifold air pressure, and therefore to reduce the peak pressure in the combustion chamber 46. Advantageously, valve 56 is located in the flow of combustion air 24 at a location upstream of heat exchanger 36, whereby the heat demand on heat exchanger 36 is also reduced when valve 56 is in an opened position. The position of valve 56 is manipulated by actuator 60. In a most simple embodiment, the combination of valve 56 and actuator 60 may be a spring relief valve directly responsive to the pressure of the compressed air 24. In such an embodiment, when the pressure of the compressed air 24 exceeds a predetermined value it will exceed the spring force holding the valve 56 in a closed position. As the pressure of compressed air 24 forces valve 56 open, a portion 58 of the compressed air 24 will escape to atmosphere, thereby lowering the mass and pressure of the compressed air being supplied to the combustion chamber 46 and lowering the peak pressure in the chamber 46 during combustion. In a further embodiment, actuator 60 may be a power actuator, such as a pneumatic or electric actuator. In this embodiment, actuator 60 is responsive to a valve position signal 62 generated as an output of controller 38, as is described more fully below.

Figure 2:
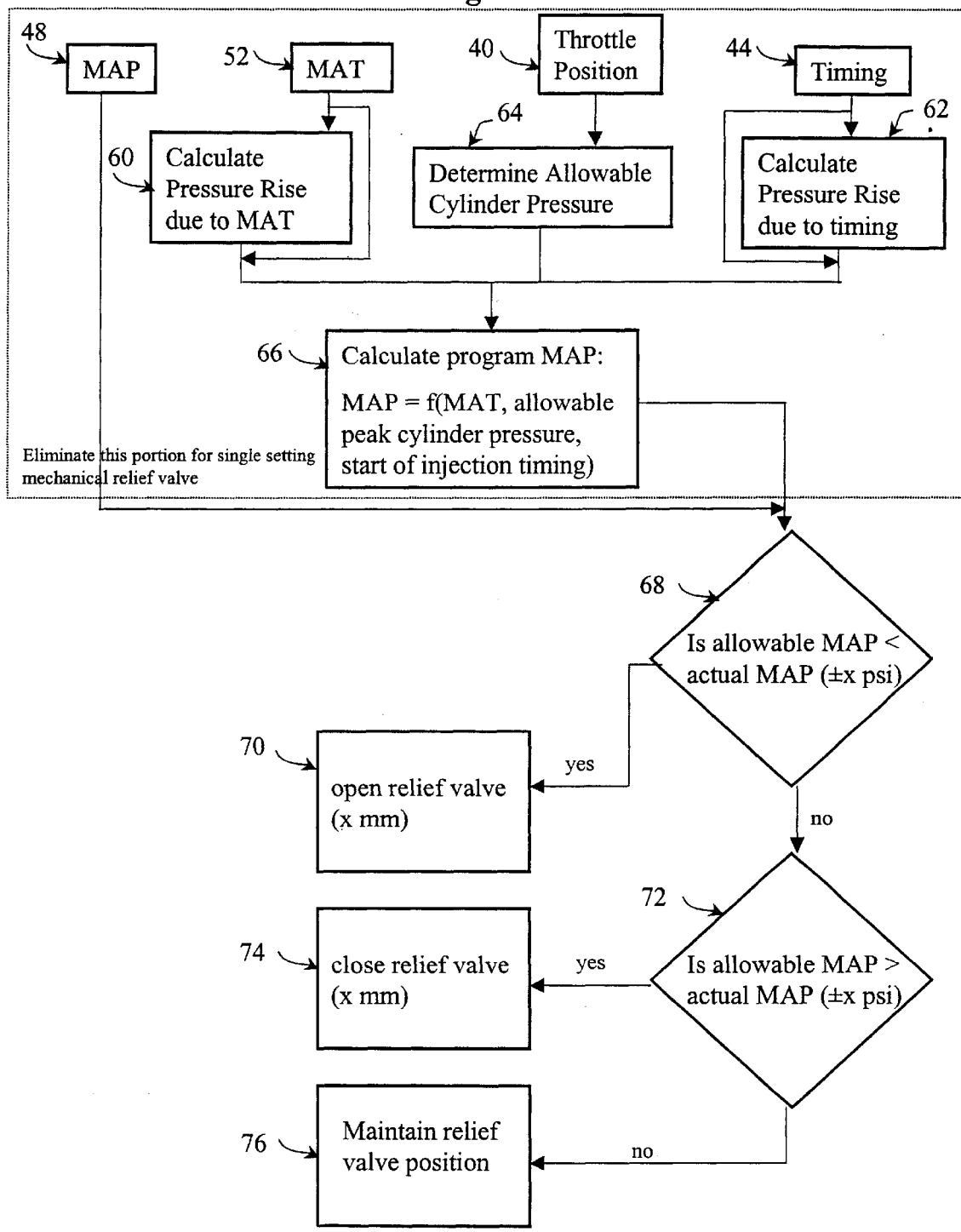
FIG. 2 is a logic diagram for the operation of the relief valve of FIG. 1.

FIG. 2 illustrates logic which may be embodied within controller 38 as hardware, software, or firmware. Controller 38 receives as input the manifold air temperature signal 52. A timing signal 44 representative of the timing of the operation of the fuel injectors 45 may be supplied to controller 38, or is preferably calculated within controller 38 for the separate fuel injection control function. It is possible to determine the polytropic pressure rise in the combustion chamber 46, i.e. the rise in pressure due to the compression effect of the piston moving upward in the cylinder. The pressure rise will be a function of the intake manifold air temperature. The relationship between intake manifold air temperature and the rise in the combustion chamber pressure will be an engine-specific function that can be determined through known modeling and/or empirical techniques. Such relationship may be programmed into controller 38 such that the polytropic pressure rise in the combustion chamber 46 over the intake manifold air pressure may be determined as a function of the manifold air temperature 52 at step 60 of FIG. 2. Similarly, it is possible to calculate or measure the pressure rise in the combustion chamber 46 over the polytropic pressure rise that results from the combustion of fuel in the combustion chamber 46. This pressure rise is a function of the timing of the fuel injection into the combustion chamber 46. This relationship may also be programmed into controller 38 so that the combustion pressure rise may be calculated as a function of timing at step 62 of FIG. 2. An allowable combustion chamber pressure may be determined for any particular engine design based upon the design parameters of the engine. The allowable pressure may be a fixed maximum value or may be a target range providing a desired level of engine performance. The allowable combustion chamber pressure may be determined at step 64 of FIG. 2 as a fixed value, or may be calculated as a function of throttle setting signal 40, since in some applications the desired allowable pressure may vary during different engine operating conditions. Knowing the allowable pressure from step 64, it is possible to determine at step 66 a program intake manifold air pressure as a function of the allowable combustion chamber pressure from step 64, the pressure rise due to compression from step 60, and the pressure rise due to combustion, from step 62. Alternatively, the program intake manifold air pressure may be determined in step 66 directly as a function of manifold air temperature from step 52, allowable peak cylinder pressure from step 64, and a start of injection timing signal from step 44. This may be accomplished by incorporating the relationships between MAT and timing to pressure rise within the functional relationship programmed to accomplish step 66. The program intake manifold air pressure 66 may then be compared with the actual intake manifold air pressure 48. The intake manifold air pressure may then be controlled as a function of this comparison, such as by having controller 38 generate valve position signal 62 as a function of the difference of these values. If the program manifold air pressure is less than the actual manifold air pressure at step 68, valve position signal 62 may be generated to open relief valve 56 at step 70. If the program manifold air pressure is greater than the actual manifold air pressure, as determined at step 72, the valve position signal 62 may be generated to close relief valve at step 74. Should the program manifold air pressure be equal to or within an acceptable range of the manifold air pressure, valve 56 may be maintained at its current position as in step 76. Controller 38 may be programmed to periodically repeat the steps of FIG. 2 to readjust the position of valve 56 in response to changes in the throttle position, ambient air temperature or pressure, or other interrelated variables. Relief valve 56 may be controlled to open and close in a single step, in incremental steps, or in a fully proportional manner, depending upon the system design requirements and the capabilities of actuator 60.

Figure 3:
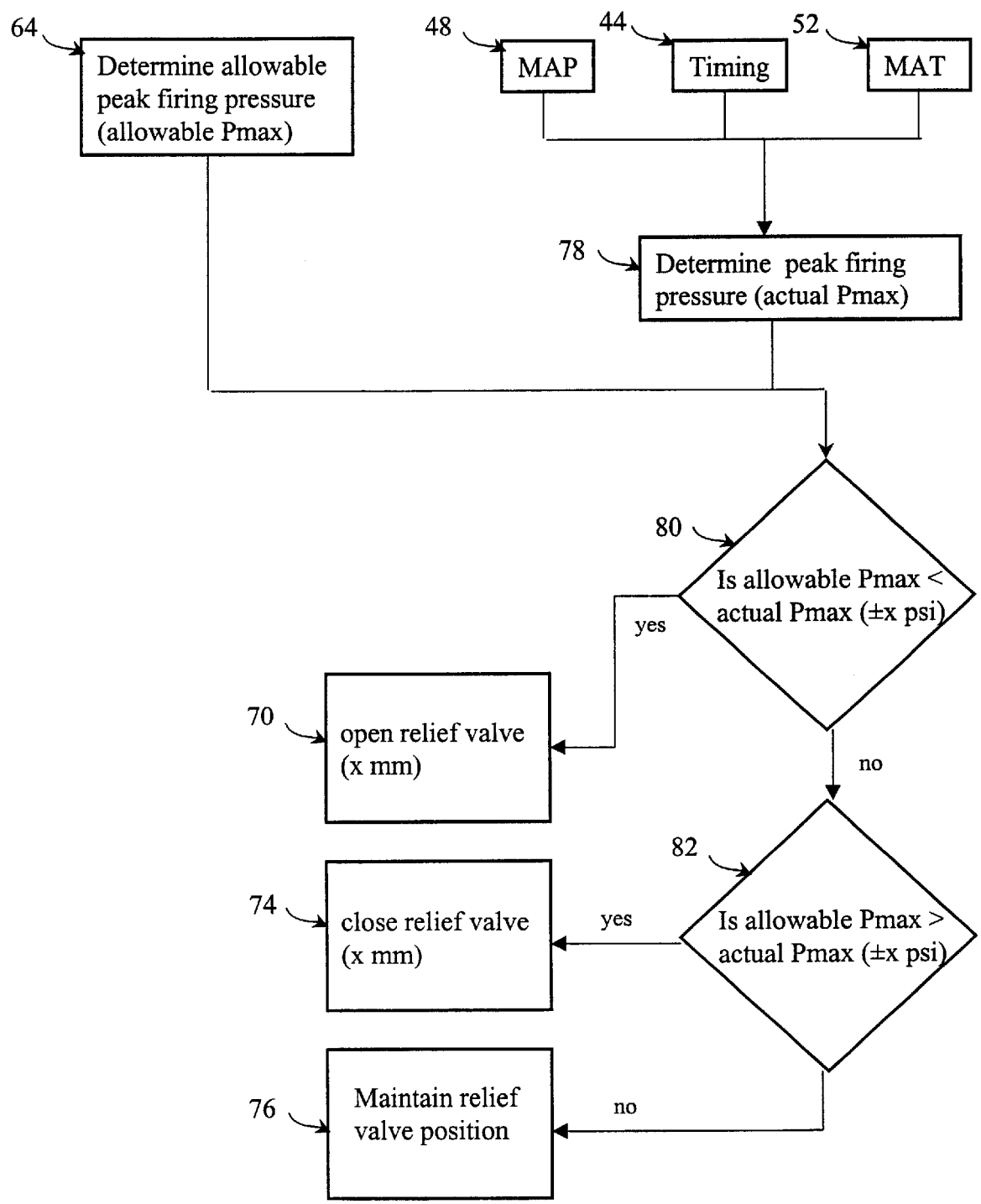
FIG. 3 is an alternative logic diagram for the operation of the relief valve of FIG. 1.

FIG. 3 is an alternative logic that may be embodied in controller 38 to arrive at the steps 70, 74, 76 for controlling the position of the valve 56. In this logic, the actual combustion chamber pressure is determined at step 78. The actual combustion chamber pressure may be empirically measured or it may be calculated as a function of intake manifold air pressure 48 and fuel injection timing 44. As discussed above, these relationships are engine specific, and may be calculated by controller 38 or may be determined by utilizing pre-programmed look-up tables. To further refine this control logic, the manifold air temperature 52 may also be utilized in step 78 for determining the actual combustion chamber pressure. The actual combustion chamber pressure is then compared to the allowable combustion chamber pressure from step 64 in steps 80,82 to arrive at one of the three alternative control actions, 70, 74, 76. As in FIG. 2, step 64 of FIG. 3 may include determining an allowable combustion chamber pressure as a function of a throttle setting signal 40 for the engine 12.

Controller 38 may advantageously be embodied within an existing electronic fuel injection controller of a locomotive. Such fuel injection controllers include logic and calculation capability, and may be embodied as a programmed logic controller, microprocessor, or personal computer. Such existing electronic fuel injection controllers typically have inputs for intake manifold air pressure and temperature signals 48,52 and for a throttle setting signal 40. Such existing hardware typically includes a fuel injection timing signal 44 as an output. Therefore, the additional logic necessary to produce a valve position signal 62 may be conveniently included by additional programming of software or firmware within controller 38. The valve position signal 62 may be programmed to be responsive to the intake manifold air pressure signal 48 and the timing signal 44. The valve position signal 62 may further be programmed to be responsive to the intake manifold air temperature signal 52, and/or the throttle position signal 40. Controller 38 may be programmed to provide a default signal to close valve 56 in the event of any system malfunction, such as a bad sensor or broken wire, etc.

In a most simple embodiment, a means for sensing the intake manifold air pressure and a means for releasing a selected portion of the compressed air to atmosphere in response to the intake manifold air pressure exceeding a predetermined value may both be embodied as a relief valve 56 controlled by a spring actuator 60. Note that dashed line 67 in FIG. 2 represents the logic path that would be followed for such an embodiment. For this embodiment, the logic leading to and including step 66 would not be needed, and the valve 56 itself would function to compare an allowable MAP to an actual MAP and to re-position itself accordingly. A more refined level of control may be obtained by providing electronic means for sensing the intake manifold air pressure, such as sensor 50, and an electronic means for releasing a selected portion 58 of the compressed air 24. Such a more refined apparatus may include controller 38, electronic or pneumatic actuator 60, and valve position signal 62. Further refinement may be achieved by adding a means for sensing the intake manifold air temperature, such as sensor 54, and by varying the pressure at which valve 56 opens as a function of the intake manifold air temperature. Such means for varying the opening pressure for valve 56 may conveniently be embodied as program instructions in controller 38. Furthermore, the pre-determined pressure at which valve 56 is opened may be also made a function of the setting of throttle 42 by programming instructions within controller 38 to be responsive to throttle position signal 40.

In one hypothetical embodiment of the present invention, an air-operated relief valve 56 may be used on a turbo-charged diesel locomotive engine 12 to provide the capability of relieving 5 psig of the compressed air 24 produced by turbo-charger 18. Assuming a compression ratio of 13:1, an initial pressure in the combustion chamber at intake valve closure of 30 psig, and a polytropic coefficient of 1.4, the peak combustion chamber pressure due to polytropic compression with valve 56 closed would be 950 psig. With relief valve 56 open and capable of relieving the intake manifold air pressure by 5 psig to 25 psig, the peak combustion chamber pressure due to polytropic compression would be reduced to 790 psig. The pressure rise due to combustion may also be reduced in this example, with the specific reduction achieved being a function of the fuel injection parameters of the particular engine. It may further be appreciated that the reduction in combustion chamber pressure may be more significant for an engine having a higher compression ratio.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only be the spirit and scope of the appended claims.

We claim as our invention:

1. A method of protecting a turbo-charged diesel locomotive engine from excessively high combustion chamber pressure, the method comprising the steps of:

determining an allowable combustion chamber pressure for the turbo-charged diesel engine;

determining a first pressure rise in the combustion chamber over intake manifold air pressure as a function of the manifold air temperature;

determining a second pressure rise in the combustion chamber over the first pressure rise as a function of a timing of fuel injection into the combustion chamber;

determining a program intake manifold air pressure as a function of the allowable combustion chamber pressure, the first pressure rise, and the second pressure rise;

installing a valve in fluid communication with the intake manifold for venting intake manifold air to atmosphere; and comparing the program intake manifold air pressure to actual intake manifold air pressure to control the operation of the valve for controlling intake manifold air pressure.

2. The method of claim 1, further comprising the step of determining the allowable combustion chamber pressure for the turbo-charged diesel engine as a function of a throttle setting for the engine.

3. The method of claim 1, wherein the engine comprises a turbo-charger for providing compressed air to an intake manifold of the engine; and wherein the step of controlling the intake manifold air pressure further comprises:

providing a relief valve in fluid communication with the intake manifold, the relief valve operable to release a selected amount of the compressed air to atmosphere; and providing an actuator attached to the relief valve, the actuator operable to position the relief valve in response to the result of the step of comparing the program intake manifold air pressure to actual intake manifold air pressure.

4. A method of operating a diesel locomotive engine the engine having a turbo-charger for providing compressed air to an intake manifold of the engine, the method comprising the steps of:

determining an allowable combustion chamber pressure for the engine;

determining the actual combustion chamber pressure;

comparing the actual combustion chamber pressure to the allowable combustion chamber pressure; and controlling intake manifold pressure as a function of the results of the step of comparing the actual combustion chamber pressure to the allowable combustion chamber pressure;

further comprising the step of determining the actual combustion chamber pressure as a function of intake manifold air pressure, intake manifold air temperature, and fuel injection timing.

5. A method of operating a diesel locomotive engine the engine having a turbo-charger for providing compressed air to an intake manifold of the engine, the method comprising the steps of:

determining an allowable combustion chamber pressure for the engine;

determining the actual combustion chamber pressure;

comparing the actual combustion chamber pressure to the allowable combustion chamber pressure; and controlling intake manifold pressure as a function of the results of the step of comparing the actual combustion chamber pressure to the allowable combustion chamber pressure;

wherein the step of determining an allowable combustion chamber pressure further comprises determining an allowable combustion chamber pressure as a function of a throttle setting for the engine.

6. A method of operating a diesel locomotive engine the engine having a turbo-charger for providing compressed air to an intake manifold of the engine, the method comprising the steps of:

determining an allowable combustion chamber pressure for the engine;

determining the actual combustion chamber pressure;

comparing the actual combustion chamber pressure to the allowable combustion chamber pressure; and controlling intake manifold pressure as a function of the results of the step of comparing the actual combustion chamber pressure to the allowable combustion chamber pressure;

wherein the step of controlling intake manifold pressure further comprises:

providing a valve in fluid communication between the turbo-charger and the intake manifold, the valve operable to release a selected amount of the compressed air to atmosphere; and controlling the position of the valve as a function of the result of the step of comparing.

7. A method of operating a diesel locomotive engine the engine having a turbo-charger for providing compressed air to an intake manifold of the engine, the method comprising the steps of:

determining an allowable combustion chamber pressure for the engine;

determining the actual combustion chamber pressure;

comparing the actual combustion chamber pressure to the allowable combustion chamber pressure; and controlling intake manifold pressure as a function of the results of the step of comparing the actual combustion chamber pressure to the allowable combustion chamber pressure;

further comprising the step of determining the actual combustion chamber pressure as a function of intake manifold air pressure and fuel injection timing.

8. An locomotive power unit comprising:

a diesel engine having an intake manifold for receiving compressed air and an exhaust manifold;

a turbo-charger having a turbine section connected to the exhaust manifold and a compressor section having an outlet connected to the intake manifold, the turbo-charger operable to provide compressed air to the intake manifold at an intake manifold air pressure; and a relief valve in fluid communication between the turbo-charger outlet and the intake manifold are operable to release a selected amount of the compressed air to atmosphere in response to the intake manifold air pressure;

wherein the relief valve comprises a control valve having an actuator, and further comprising:

a controller having a first input corresponding intake manifold air pressure and a second input corresponding to fuel injection timing for the engine and having as output a valve position signal, the output being responsive to the first input and the second input; and the actuator being responsive to the valve position signal.

9. The power unit of claim 8, further comprising:

the controller having a third input corresponding to the intake manifold air temperature; and the output being responsive to the first input, the second input, and the third input.

10. The power unit of claim 8, further comprising:

the controller having a third input corresponding to the throttle position; and the output being responsive to the first input, the second input, and the third input.

* * * * *